(12) United States Patent
Fournier et al.

(10) Patent No.: US 6,223,774 B1
(45) Date of Patent: May 1, 2001

(54) REDUNDANT REGULATION VALVE

(75) Inventors: Jean-Pierre Fournier, Ecos; Francis Meyer, Venables; Christian Languedoc, Port-Mort; David Salze, Pouance, all of (FR)

(73) Assignee: Societe Nationale d'Etude et de Construction de Moteurs d'Aviation-S.N.E.C.M.A., Paris (FR)

( * ) Notice: Subject to any disclaimer, the term of this patent is extended or adjusted under 35 U.S.C. 154(b) by 0 days.

(21) Appl. No.: 09/221,941

(22) Filed: Dec. 28, 1998

(30) Foreign Application Priority Data

Dec. 29, 1997 (FR) .................................................. 97 16616

(51) Int. Cl.$^7$ .............................. F16K 31/04; F16K 3/18; F16K 5/14
(52) U.S. Cl. ..................................... 137/637.2; 137/487.5; 137/613; 137/637.3; 137/637.4; 251/129.11
(58) Field of Search ................................ 137/637, 637.2, 137/637.4, 487.5, 613, 637.3; 251/31, 289, 129.11

(56) References Cited

U.S. PATENT DOCUMENTS

| | | | |
|---|---|---|---|
| 923,526 | * 6/1909 | Houser | 251/129.13 |
| 1,378,405 | * 5/1921 | Farmer | 251/289 |
| 1,447,652 | * 3/1923 | Farmer | 251/289 |
| 2,059,364 | * 11/1936 | Kimball | 251/289 |
| 2,141,614 | * 12/1938 | Mott | 251/289 |
| 3,240,466 | * 3/1966 | Meyer | 251/289 |
| 3,280,842 | * 10/1966 | Weisenbach | 251/289 |
| 3,375,849 | * 4/1968 | Swartz | 251/289 |
| 3,757,820 | * 9/1973 | Aylesworth | 137/625.3 |
| 4,498,471 | 2/1985 | Kranz et al. | 128/204.26 |
| 4,568,061 | 2/1986 | Rabe | 251/315 |
| 5,042,363 | * 8/1991 | Eriksson et al. | 251/289 |
| 5,095,939 | 3/1992 | Alderfer et al. | 137/512.1 |
| 5,247,964 | 9/1993 | DeLange | 137/599 |
| 5,983,743 | * 11/1999 | McGregor et al. | 251/129.13 |

FOREIGN PATENT DOCUMENTS 2 675 230   10/1992   (FR) .

* cited by examiner

Primary Examiner—George L. Walton
(74) Attorney, Agent, or Firm—Weingarten, Schurgin, Gagnebin & Hayes LLP

(57) ABSTRACT

The redundant regulation valve for controlling fluid flow comprises a valve body defining a passage for the flow of the fluid, a main throttle element movable by means of a main control device to selectively obstruct the passage, and a redundant throttle element movable by means of a redundant control device. When the valve is in its closed position in normal operation, the main element and the redundant element are in contact with each other. In this normal closed position, the main element is close to its fully-extended position in the closure direction and it obstructs only about half of the passage, while the redundant element is in a position of medium extension. The stroke of the redundant element is such that the redundant element can be controlled to obstruct the entire passage even when the main element is in its fully-open position.

17 Claims, 10 Drawing Sheets

REDUNDANT REGULATION VALVE

FIELD OF THE INVENTION

The present invention relates to a redundant regulation valve for controlling the flow of a fluid, the valve comprising a valve body defining a fluid flow passage and a main throttle element movable by means of a main control device to close said passage selectively.

PRIOR ART

FIG. 5 is a diagram of a hydraulic installation having full redundancy for controlling selective flow of a fluid in a circuit comprising main pipes 10 and 13. In that redundant system, two parallel pipes 11 and 12 are interposed between the main pipes 10 and 13, and each parallel pipe has interposed therein a series connection of a stop valve 21 (or 22) and a regulation valve 31 (or 32).

The circuit shown diagrammatically in FIG. 5 does indeed provide total redundancy by complete duplication of all of the equipment (stop valve and regulation valve), but it suffers from major drawbacks, insofar as the system is bulky, having elements that lead to large mass, thereby making it unsuitable, particularly in space applications.

The totally redundant circuit is also expensive and can be difficult to implement when there are difficult transient stages within a regulated system.

Proposals have also been made, as shown diagrammatically in FIG. 6, to use a regulation valve with a valve body 3 defining a flow passage 4 for a fluid that can be shut off by a selective shutter system comprising a throttle bar 1A capable of moving linearly in the passage 4 to come into abutment in a fixed groove 1C in the valve body 3 under drive from a control device 1B. In order to increase safety without significantly increasing mass or cost, the control device 1B is redundant, i.e. it has its control members in duplicate so that a substitute element can come into action in the event of an initial element of the control device 1B failing.

Such redundancy of the control members only is easy to implement and makes the assembly more reliable, however it does not provide a solution to the case where the throttle element 1A itself turns out to be faulty, e.g. because it jams. Unfortunately, such a failure can have catastrophic consequences in certain applications.

OBJECTS AND BRIEF DESCRIPTION OF THE INVENTION

The invention seeks to remedy the above-mentioned drawbacks and to enable operating safety of a fluid regulation valve to be increased without significantly increasing the complexity or the bulk of the system, and while retaining low mass and reasonable costs in manufacturing, assembling, and operating the equipment as a whole.

These objects are achieved by a redundant regulation valve for controlling fluid flow, the valve comprising a valve body defining a fluid flow passage, and a main throttle element that is movable by means of a main control device to selectively obstruct said passage, the valve further comprising a redundant throttle element movable by means of a redundant control device, wherein in the closed position of the valve, in normal operation, the main element and the redundant element are in contact with each other, wherein in said normal closed position, the main element is in the vicinity of its position of maximum displacement in the closure direction and obstructs only about half of the passage, while the redundant element is in a medium displacement position, and wherein the stroke of the redundant element is such that the redundant element can be controlled to obstruct the passage even when the main element is in its fully-open position.

More particularly, the main throttle element or the main control device is associated with an abutment device that acts in the fully-open position and in the normally closed position of the valve, and the redundant throttle element or the redundant control device is associated with an abutment device that acts in the fully-open position of the main throttle element and in the emergency closure position of the redundant throttle element.

In a particular embodiment, the main control device comprises an electric motor and a screw-and-nut assembly driving the main throttle element.

Similarly, the redundant control device comprises an electric motor and a screw-and-nut assembly driving the redundant throttle element.

In an aspect of the invention, the main control device is associated with a regulation loop, comprising:

a) means for causing the main element to open in compliance with a controlled relationship until it reaches its nominal open position;

b) means for acting when said nominal open position is reached, to servo-control the position of the main element to a predefined parameter associated with a member fed by the flow of fluid through the valve; and c) means for causing the main element to close in compliance with a second controlled relationship and which ensures end-of-stroke braking of the main element coming into abutment against the redundant element.

More particularly, the regulation loop associated with the main control device and with the redundant control device further comprises:

d) means for detecting that opening of the main element is not in compliance with said first controlled relationship;

e) means for controlling displacement of the redundant element in the event of non-compliance with said first controlled relationship during opening of the main element;

f) means for detecting non-compliance of the servo-control of the main element with said predefined parameter;

g) means for servo-controlling displacement of the redundant element in the event of non-compliance of said servo-control of the main element.

h) means for detecting non-compliance of the closure of the main element with said second controlled relationship; and i) means for causing the displacement of the redundant element in the event of non-compliance with said second controlled relationship during closure of the main element.

In a first embodiment, the main throttle element and the redundant throttle element are respectively constituted by a main throttle bar and by a redundant throttle bar in axial alignment and axially movable in translation respectively by means of the main control device and by means of the redundant control device.

In a particular embodiment, the axially-aligned main bar and redundant bar are in contact in the normal closed position via annular plane front surfaces.

In another particular embodiment, the axially-aligned main bar and redundant bar are in contact in the normal closed position via conical or bullet-shaped circularly symmetrical surfaces.

In yet another particular embodiment, the main bar and the redundant bar are coaxial and partially engaged one in the other.

In which case, advantageously, the main bar has internal channels allowing the flow to pass through and opening out radially via openings passing through the cylindrical wall of said main bar, gaskets are interposed between the coaxial cylindrical surfaces of the main bar and of the redundant bar, and at least one of the radial openings of the main bar is selectively obstructable by the cylindrical wall of the redundant bar in which the main bar is engaged.

In another embodiment, the main throttle element and the redundant throttle element are respectively constituted by a main throttle bar and by a redundant throttle bar which are in axial alignment and which are provided with throttle flaps movable in rotation respectively by means of the main control device and by means of the redundant control device.

According to a particular characteristic, the valve includes shock absorber devices disposed at the interfaces between the main control device and the main throttle element, and between the redundant control device and the redundant throttle element.

BRIEF DESCRIPTION OF THE DRAWINGS

Other characteristics and advantages of the invention appear from the following description of particular embodiments given as examples with reference to the accompanying drawings, in which.

DETAILED DESCRIPTION OF PARTICULAR EMBODIMENTS

Figure 1:
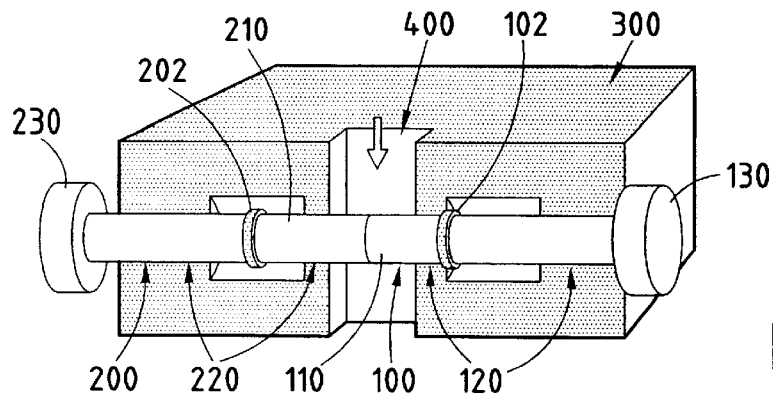
FIGS. 1 to 4 are diagrammatic views showing the principle on which a redundant regulation valve of the present invention operates, comprising respectively a view of the valve in its normal closed position, a view of the valve in its normal open position, and two views of the valve in its closed position for two cases of breakdown of the normal main element for closing the valve, the throttle elements being movable axially in translation.

Reference is made initially to FIGS. 1 to 4 for explaining the nature and the function of a regulation valve of the invention, in an embodiment of the type that moves in translation.

A regulation valve of the invention comprises a valve body 300 defining a fluid flow passage 400 which is selectively obstructable by means of a main shutter assembly 100 and a redundant shutter assembly 200.

The main shutter assembly 100 comprises a main throttle bar 110, means 120 for guiding the main bar 110, an abutment 102, and a control member 130 for controlling the main bar 110.

The redundant shutter assembly 200 comprises a redundant throttle bar 210, guide means 220 for guiding the redundant bar 210, an abutment 202, and a control member 230 for controlling the redundant bar 210.

The main shutter assembly 100 and the redundant shutter assembly 200 can be of configurations that are quite similar. Nevertheless, the way each of the assemblies 100 and 200 is arranged relative to the valve body 300 is different.

As can be seen in FIGS. 1 to 4, the main throttle bar 110 and the redundant throttle bar 210 are in axial alignment and can be displaced axially individually by the respective control devices 130 and 230.

In normal operation, when the valve is in the closed position (FIG. 1), the main bar 110 and the redundant bar 210 are in contact with each other. In this normal closed position, where flow along the passage 400 is interrupted by the bars 110 and 210, the main bar 110 is close to its fully-extended position in the closure direction (abutment 102 placed in its leftmost position), while the redundant bar 210 is in a position of medium extension (abutment 202 situated in a medium position).

Figure 2:
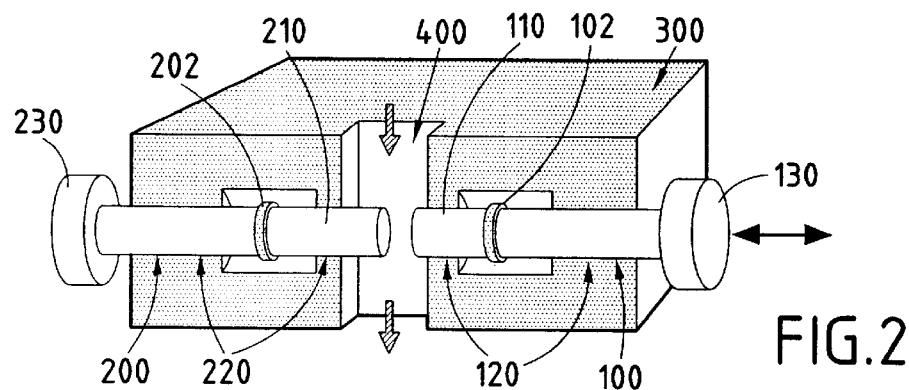

When the valve is opened, the main bar 110 is normally moved to the right in FIG. 2 to allow fluid to flow along the passage 400. The main bar 110 is actuated by the main control device 130 which serves to move the main bar 110 in linear manner and in both directions, thereby enabling the fluid flow along the passage 400 to be regulated. Under normal conditions of operation, the redundant bar 210 remains in the same position as shown in FIG. 1, and it does not participate in modulating the fluid flow along the passage 400. The redundant bar 210 is driven by the redundant control device 230 to participate in regulating the flow of fluid along the passage 400 only in the event of the main bar 110 or the main control device 130 failing.

Figure 3:
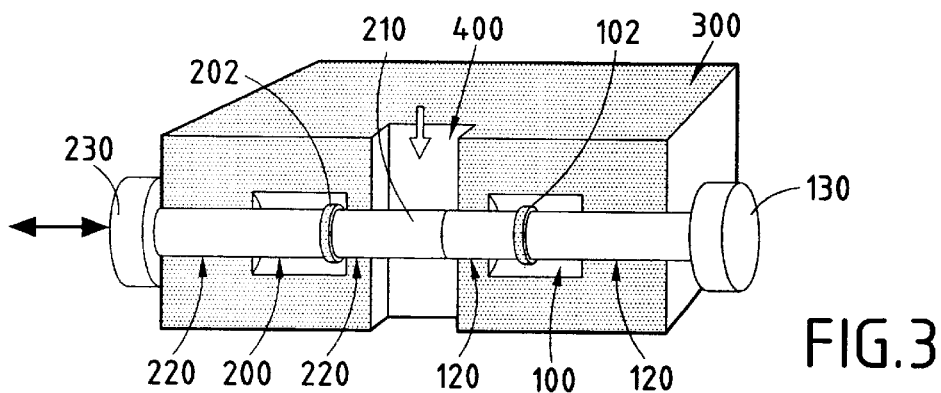
Figure 4:
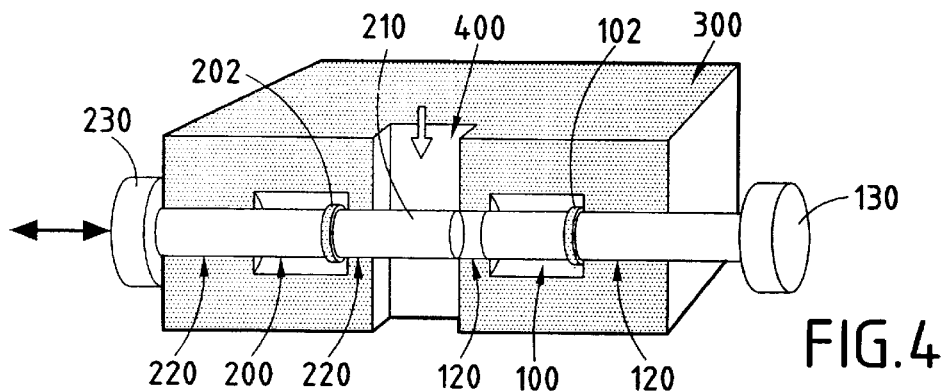
Figure 5:
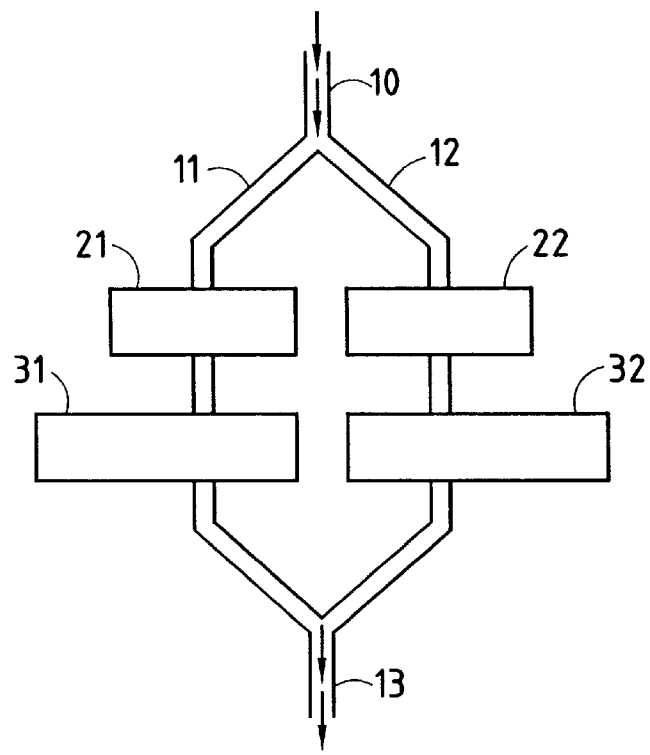
FIG. 5 is a diagrammatic view of a known system having full redundancy with four valves distributed in two parallel circuits, each of which has two valves in series.
Figure 6:
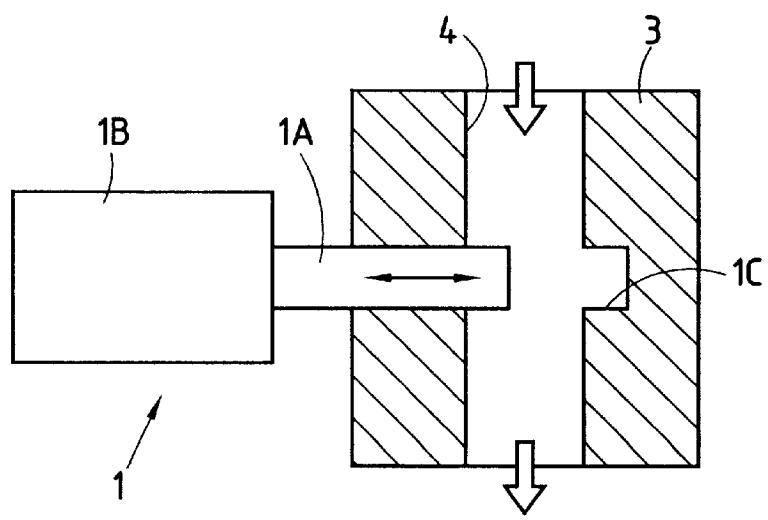
FIG. 6 is a diagrammatic view of a known regulation valve having redundant control.

FIGS. 3 and 4 show a breakdown of the main throttle bar 110 or of its control device 130. In FIG. 3, the main bar 110 is partially engaged in the passage 400, but due to a failure it has not been possible to move it far enough to the left to close the valve. The redundant bar 210 is then actuated by the control device 230 to come into abutment against the main bar 110, thereby reclosing the valve.

In FIG. 4, the main bar 110 has retracted into its fully-open position for the valve so that it does not obstruct the passage 400, even in part. Its abutment 102 is then in its rightmost position in FIG. 4. The redundant bar 210 is itself actuated by the redundant control device 230 so as to obstruct the passage 400 completely on its own. The abutment 202 is then in its rightmost position in FIG. 4.

From the operation as explained with reference to FIGS. 1 to 4, it can be seen that the stroke of the redundant bar 210 is such that the redundant bar 210 can be controlled to obstruct the passage 400 even when the main bar 110 is in its fully-open position.

Conversely, if the main bar 110 is blocked in its normal closure position as shown in FIG. 1, where it obstructs substantially half the section of the passage 400, and if following a breakdown the main bar 110 can no longer be retracted to open the valve as shown in FIG. 2, then the redundant bar 210 can itself be retracted to the left (since its abutment 202 is only in the mid-stroke position) so as to open the passage 400 with the possibility of regulating the section of the opening by using the redundant control circuit 230.

Thus, specifically because sealing is provided between two moving throttle elements 110 and 120 that are positioned in a well-defined manner when the valve is closed (FIG. 1), the valve presents redundancy in opening, in closing, and during servo-control.

The channel 400 can have a section of various shapes, but advantageously it is rectangular in section. The main throttle element 110 can obstruct only half of the hydraulic channel 400 (FIG. 1). In contrast, the redundant throttle element 210 is designed to be capable of obstructing the hydraulic channel 400 completely (FIG. 4). Sealing means (not shown in FIGS. 1 to 4) are associated with the main and redundant throttle elements 110 and 210.

The abutment devices 102 and 202 can be secured to main and redundant control devices 130 and 230, or to the hydraulic portion of the valve as constituted by the main and redundant throttle elements 110 and 210.

The abutment 102 is active in the closed position of the valve (FIG. 1, left position) and also in a fully-open position of the valve (right position as shown in FIG. 4 which corresponds to a main throttle element 110 held in the fully-open position).

The abutment 202 is active in the position where the valve is closed by the redundant throttle element 210 (FIG. 4, right position). If the main throttle element 110 is blocked in its closed position (FIG. 1), and if opening of the valve is controlled by the redundant control device 230, then the abutment 202 can also be moved into a leftmost position corresponding to the valve being opened fully by the redundant throttle element 210.

The control devices 130 and 230 are advantageously of the electrical type.

In normal operation of the valve using the main throttle element 110, the redundant throttle element 210 is held stationary by a brake, or because its control system is not reversible, for example if the redundant control device includes control by means of a motor and gear box unit having a large gear ratio or if it is controlled by a piezoelectric motor.

When the valve is operated by the redundant throttle element 210, it can even be advantageous to guarantee that the main throttle element 110 is held in position by a main control device 130 of the same type as that used for the redundant control device 230.

Figure 7:
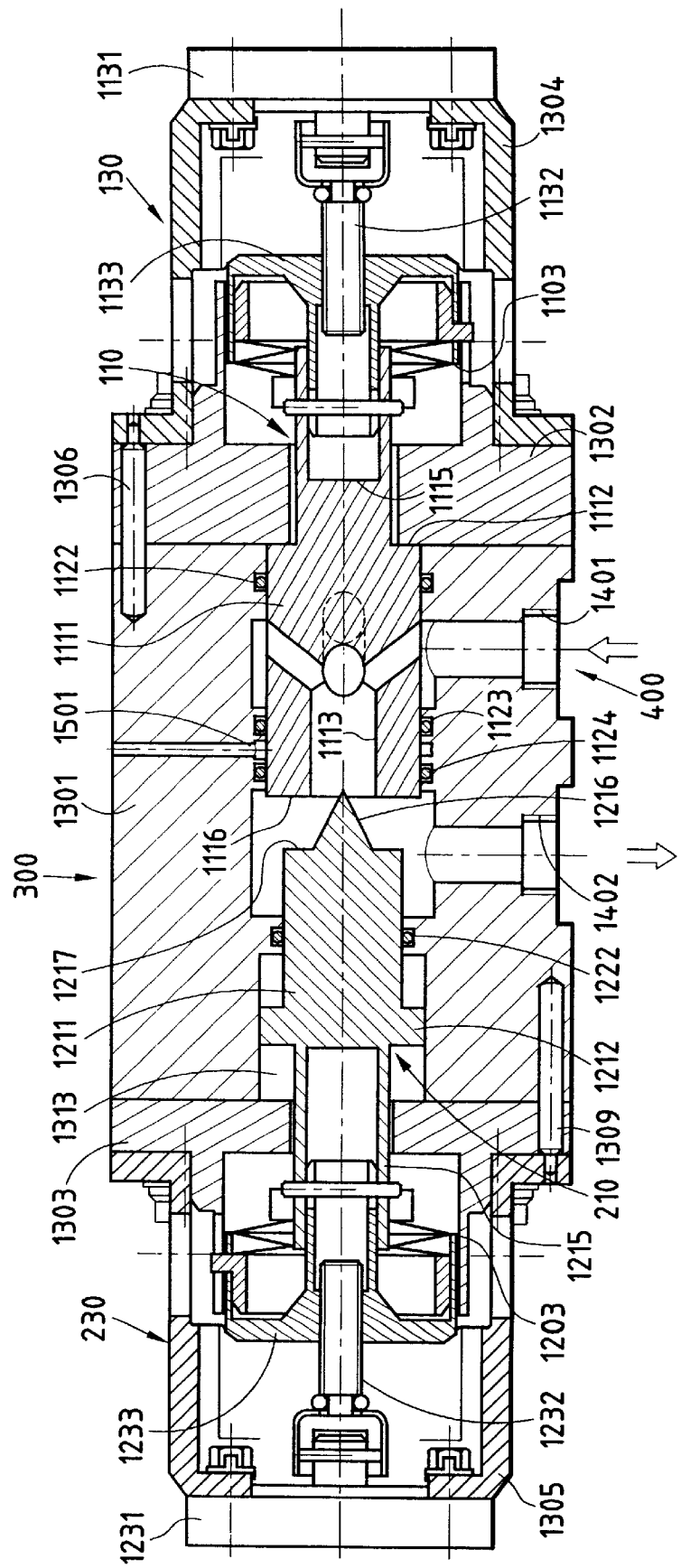
FIGS. 7 to 9 are axial section views of three variants of a redundant regulation valve constituting a first embodiment of the invention having two throttle bars that are in axial alignment and movable in translation.
Figure 8:
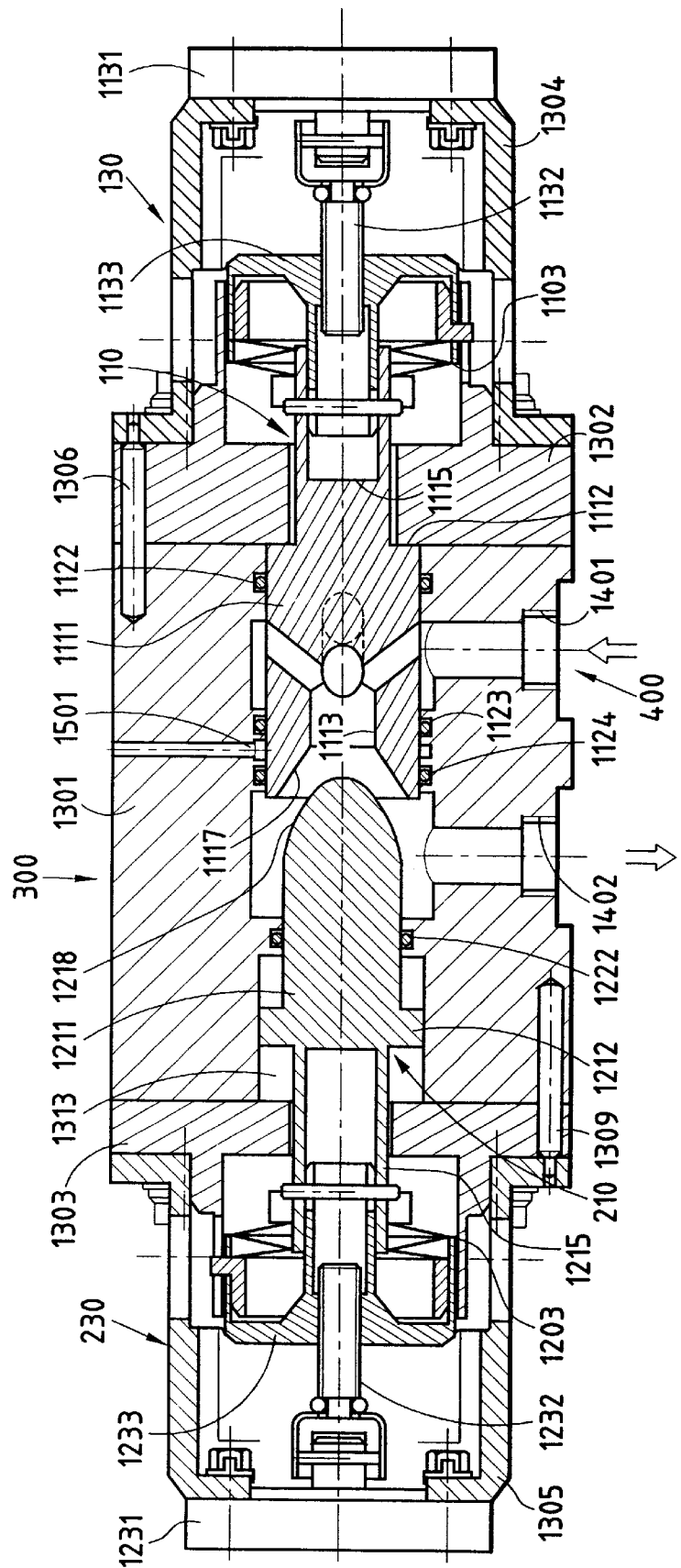
Figure 9:
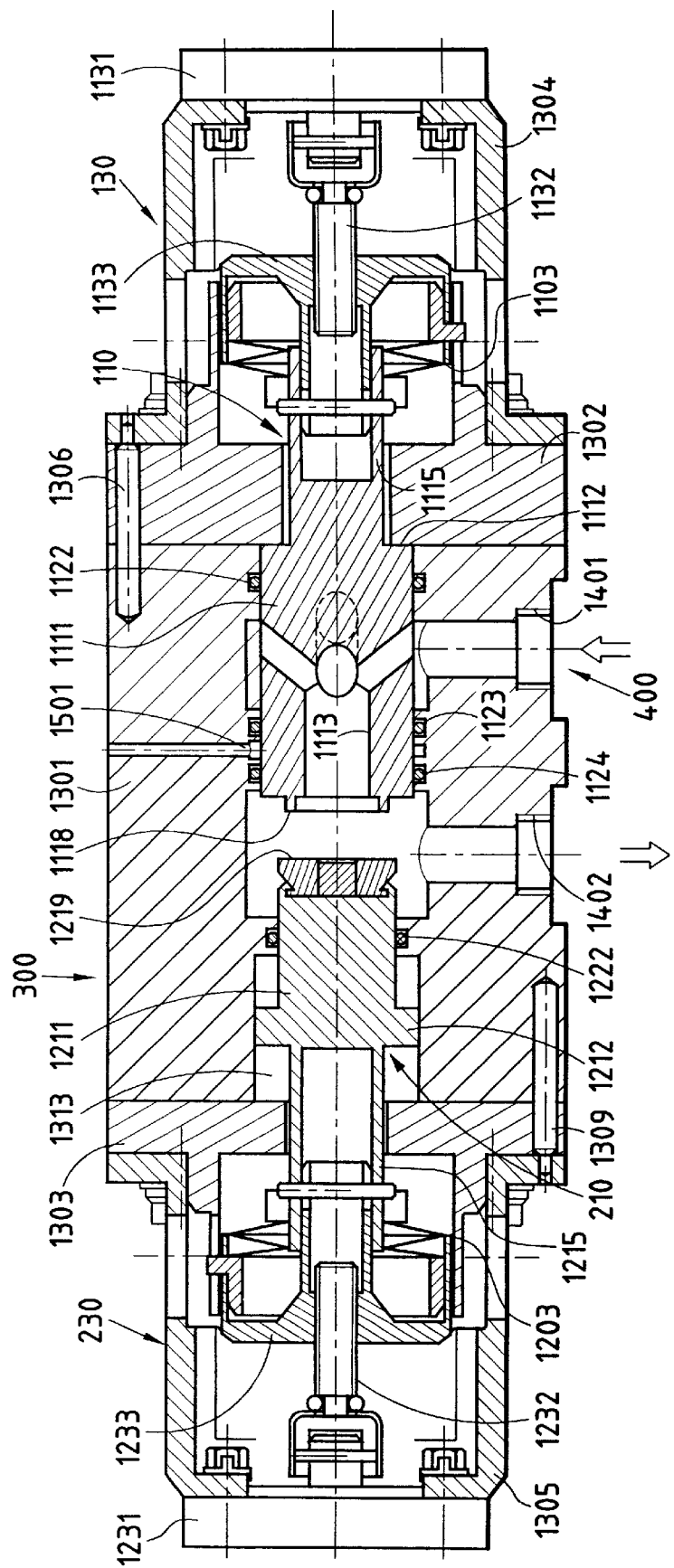

A first embodiment of a regulation valve of the invention is described below with reference to FIGS. 7 to 9. FIGS. 7 to 9 show three variant embodiments having different configurations for the contact surfaces between the end of the main bar 110 and the end of the redundant bar 210. Apart from these different shapes for the contact surfaces, the remainder of the component elements of the valve are identical in all three variants and they are given the same references. The first embodiment is described initially in greater detail with reference to FIG. 7, which relates to a valve having throttle bars that are movable in translation.

The valve body 300 of FIG. 7 comprises a central portion 1301 and two lateral portions 1302 and 1303 placed against the central portion 1301 and fixed thereto by link elements 1306 and 1309. The central portion 1301 of the valve body 300 defines a passage 400 for fluid flow having an inlet orifice 1401, an outlet orifice 1402, and cavities 1403 and 1404 that can be selectively closed by a main bar 110 and by a redundant bar 210. In the example of FIG. 7, the main bar 110 comprises a cylindrical main body 1111 pierced by channels 1113 and extended at its rear end (on the right in FIG. 7) by a portion 1115 of smaller section, engaged in the control device 130. The cylindrical main body 1111 serves as guide means 120 for the main bar 110, guiding it relative to a bore formed in the central portion 1301 of the valve body. Gaskets 1122, 1123, and 1124 are interposed between the outer cylindrical surface of the main body 1111 and the corresponding bore of the central portion 1301.

The main control device 130 comprises an electric motor 1131, e.g. of the brushless torque motor type, whose body is connected to the side portion 1302 of the valve body by a case 1304. The outlet shaft of the electric motor 1131 controls a screw-and-nut assembly 1132–1133 connected to the rear portion 1115 of the main bar 110 to cause it to move linearly in axial translation in one direction or the other. The motor 1131 is itself controlled by a regulation system having applied thereto signals from a sensor 1501 for sensing the position of the main bar 110.

In the example of FIG. 7, the redundant bar 210 comprises an essentially cylindrical main body 1211 which can slide relative to a cylindrical bore in the central portion 1301 of the valve body. A gasket 1222 is interposed between the main body 1211 and the cylindrical bore corresponding to the central portion 1301. A cylindrical portion of larger section 1212 of the redundant bar 210 can be used as a guide and as an abutment inside a cylindrical cavity 1313 formed in the central portion 1301 of the valve body. The redundant bar 210 is extended from its rear end (to the left in FIG. 7) by a portion 1215 of smaller section, engaged with the redundant control device 230 which itself comprises an electric motor 1231, e.g. of the brushless torque motor type, whose own body is connected to the side portion 1303 of the valve body by a case 1305. The outlet shaft of the electric motor 1231 controls a screw-and-nut assembly 1232–1233 connected to the rear portion 1215 of the redundant bar 210 to cause it to move linearly in axial translation in one direction or the other, in the event of the main bar 110 or its control system failing. Shock absorber devices 1103 and 1203 are placed at the interfaces firstly between the main control device 130 and the rear portion 1115 of the main bar 110, and secondly between the redundant control device 230 and the rear portion 1215 of the redundant bar 210.

The front portion of the redundant bar 210 in the assembly shown in FIG. 7 has a conical central portion 1216 suitable for penetrating into an axial channel 1113 of the main body 1111 of the main bar 110, and a plane annular peripheral front portion 1217 which can come into contact with a plane annular peripheral front portion 1116 of the main bar 110 when the valve is in its closed position in a situation analogous to that shown in FIGS. 1 and 3 where the front terminal portions of the main bar 110 and of the redundant bar 210 are put into contact. FIG. 7 itself corresponds to a position in which the valve is open, analogous to the position of FIG. 2. The references 1112 and 1212 designate examples of abutments for the main and redundant bars 110 and 210.

FIGS. 8 and 9 correspond to variants of the FIG. 7 embodiment which are likewise shown with the valve in its open position. Elements that are identical in the variants of FIGS. 7, 8, and 9 are given the same references and are not described again.

In the FIG. 8 variant, the surface 1117 of the terminal portion of the main body 1111 of the main bar 110 is conical, while the leading portion 1218 of the main body 1211 of the redundant bar 210 is bullet-shaped so as to come into contact over an annular zone with the conical surface 1117 when the valve is in its closed position. FIG. 8 itself corresponds to an open position of the valve, analogous to the position of FIG. 2.

In the variant of FIG. 9, the surface 1118 of the terminal portion of the main body 1111 of the main bar 110 has the form of an annular plane surface formed on a collar on the main body 1111 and designed to co-operate with a front plane face 1219 of the main body 1211 of the redundant bar 210 when the valve is in the closed position. FIG. 9 itself corresponds to the valve being in an open position, analogous to the position of FIG. 2.

Figure 10:
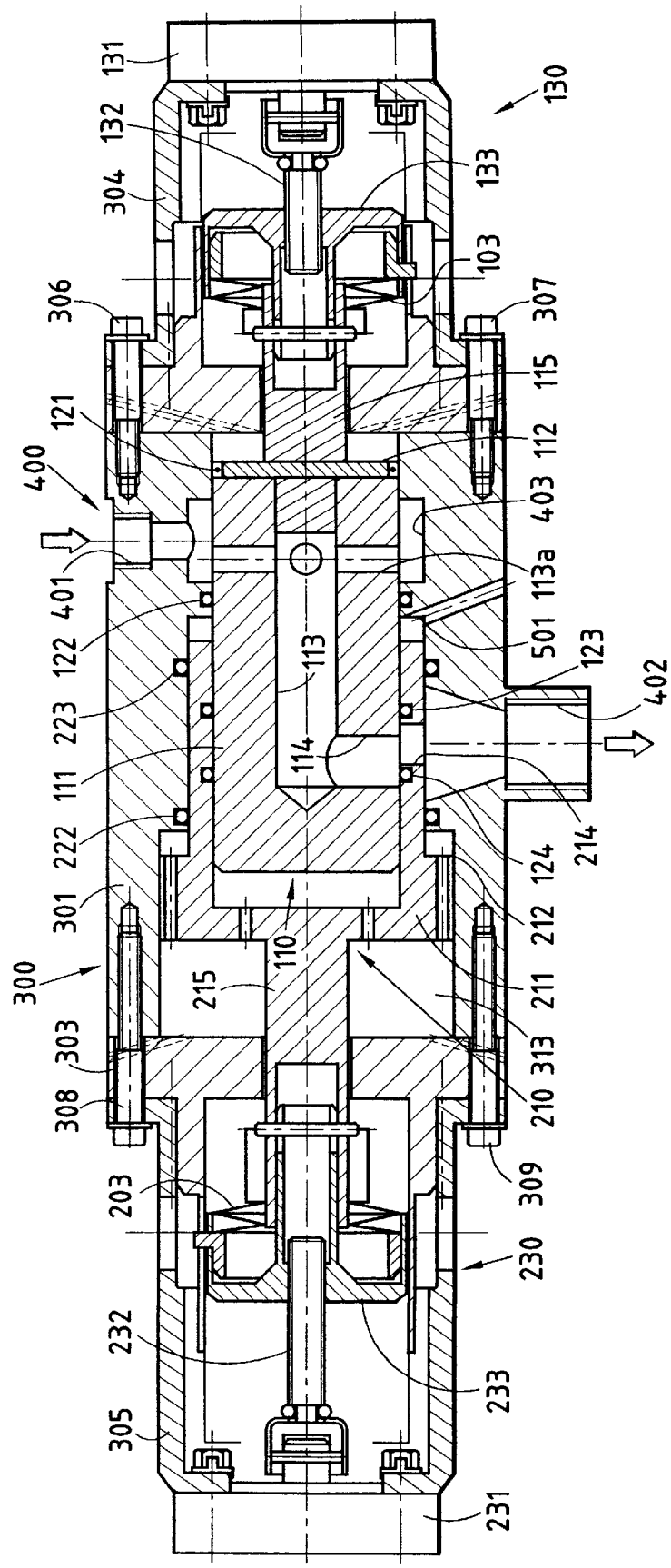
FIG. 10 is an axial section view of a redundant regulation valve constituting a second embodiment of the invention, having two axially-movable throttle bars that are coaxial and partially engaged one within the other.

FIG. 10 shows a second embodiment of the invention. In FIG. 10, elements analogous to those of the embodiment of FIGS. 7 to 9 are given references corresponding to the last three digits of the corresponding elements described above with reference to FIGS. 7 to 9. The elements 301 to 303 of the valve body 300, interconnected by link means 306 to 309, the main control device 130, and the redundant control device 230, all of which have similar characteristics in FIGS. 7 to 10, are not described again in detail.

The embodiment of FIG. 10 differs in particular by the fact that the main bar 110 and the redundant bar 210 are coaxial and partially engaged one in the other.

More particularly, the main bar 110 comprises a main body 111 with an axial internal channel 113 providing a passage for the flow and opening out radially via openings 113a, 114 through the cylindrical wall of the main bar 110 so as to make it possible when the valve is in its open position for fluid to pass from the inlet orifice 401 of the valve body to the internal channel 113, and from the internal channel 113 to the outlet orifice 402 via an orifice 214 formed in the cylindrical wall of the body 211 of the redundant bar 210 in which the main bar 110 is engaged. The positions of the main bar 110 and of the redundant bar 210 are adjusted so that the radial openings 114 and 214 of the bars 110 and 210 are not superposed when the valve is in its closed position corresponding to the situations shown in FIGS. 1, 3, and 4, or else they overlap when the valve is in its open position as shown in FIG. 10, and corresponding to the situation of FIG. 2.

In FIG. 10, reference 501 designates a sensor for sensing the position of the main bar 110. The sensor 501 is placed facing the main body 111 of the main bar 110, however it could also be placed facing the rear portion 115 of said main bar 110.

In operation, the main bar 110 penetrates into the bore 314 of the redundant bar 210, and the redundant bar 210 can itself move over a stroke that is limited but that may be about twice that of the main bar 110, inside a bore 313 formed in the valve body 300.

In the screw-and-nut system 232–233 of the redundant control device 230, the screw 232 is about twice as long as the screw 132 of the screw-and-nut system 132–133 of the main control device 130.

A regulation valve of the invention is particularly suitable for use in space, for example to be interposed on a line feeding propellant to a gas generator that is designed to drive the turbopumps for feeding propellant to a rocket engine.

Implementing the control devices 130 and 230 by using screw-and-nut systems ensures that the throttle bars 110 and 210 are blocked in the positions that are defined by the regulation circuits, even in the presence of high levels of vibration at high pressure.

The position of a valve of the invention is advantageously servo-controlled in a regulation loop that takes account of a predefined parameter associated with the operation of a member that is being fed by the fluid flow passing through the valve.

When applied to a valve for feeding a gas generator which is associated with a rocket engine, the regulation loop serves to control the power of the gas generator used for driving the turbopumps that feed propellant to a rocket engine, and consequently enable the power of the rocket engine to be controlled by adjusting the position of the throttle element in the valve.

The process for controlling a valve of the invention integrated in a regulation loop of the kind defined above with reference to the operation of a gas generator associated with a rocket engine is as follows:

Initially, both throttle elements (the plungers or main bar 110 and redundant bar 210) are in contact with each other on the axis of the fluid passage (FIG. 1). When the gas generator is to be put into operation, the valve is opened using a controlled relationship by acting on the control device 130 of the main bar 110 (FIG. 2). When the main bar 110 reaches its position that corresponds to nominal opening, displacement of the main bar 110 becomes servo-controlled to a parameter of the rocket engine. At the end of rocket engine operation, the engine is turned off by acting on the valve via the main control device 130 which causes the main bar 110 to move in application of a controlled relationship that takes account of end-of-stroke braking or damping so as to avoid applying a shock against the redundant bar 210 that constitutes an abutment.

The redundant control device 230 is used in the event of a breakdown in the main control device 130 or the main bar 110, for example on opening the valve if the opening of the device does not occur, or during regulation if the displacements of the main bar 110 as detected show that the main bar 110 is not moving in compliance with the orders it receives, or indeed on closing if the main bar 110 is jammed in a retracted position.

Figure 17:
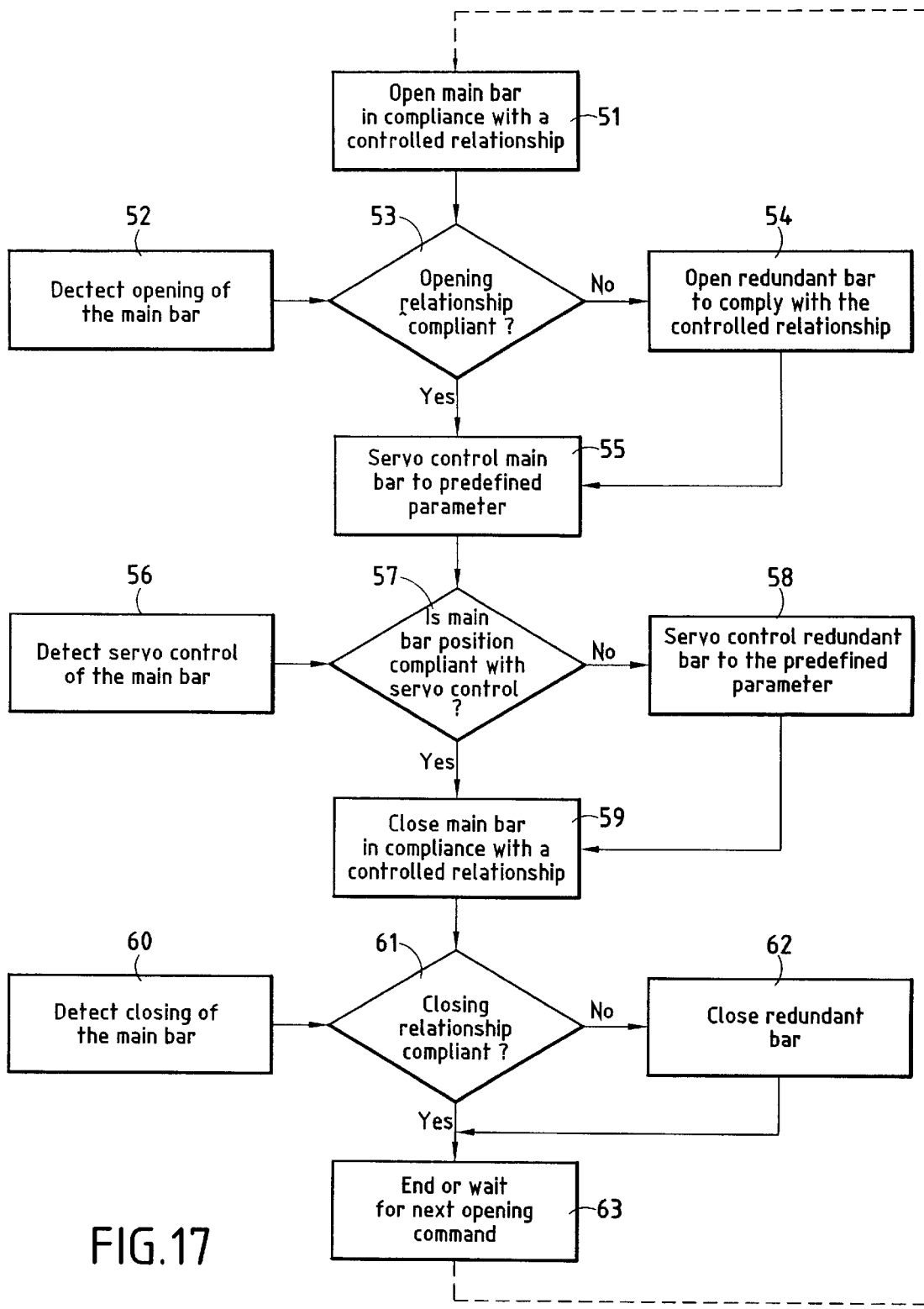
FIG. 17 is a flow chart showing how control means are implemented for controlling the two throttle bars of a regulation valve of the invention.
Figure 18:
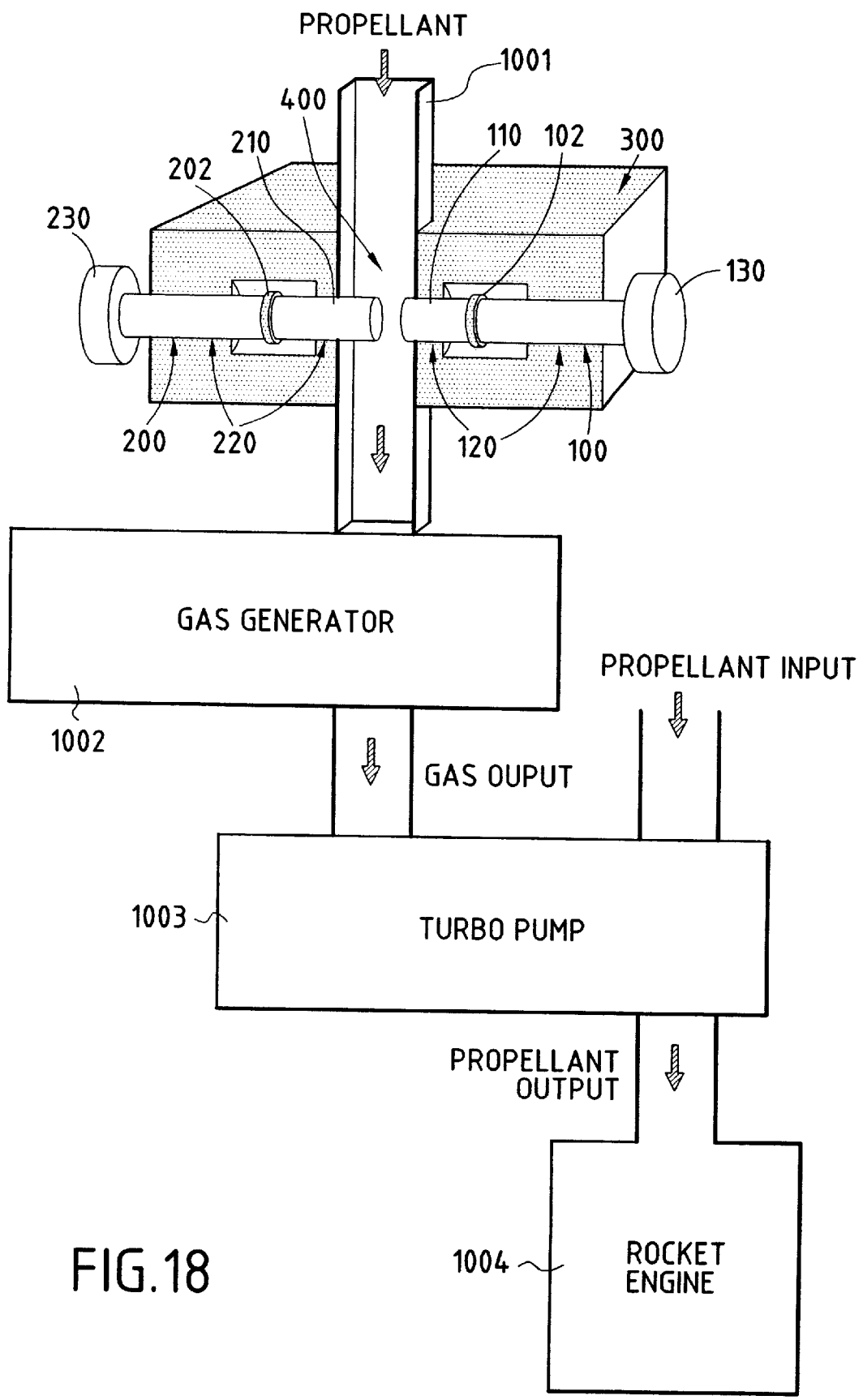
FIG. 18 is a block diagram of a redundant regulation valve used in combination with a gas generator, turbo pump, and rocket engine.

FIG. 17 summarizes the main steps in the operation of a regulation loop controlling the main control device 130 and the redundant control device 230.

In a first step 51, the main control device 130 opens the valve by moving the main bar 110 in compliance with a controlled relationship. In parallel, in a step 52, a detector for detecting the position of the main bar 110 provides information to the regulation loop, which information is tested in a step 53. If it is observed that the valve is not opening in compliance with the controlled relationship, then control passes via a step 54 to the redundant control device 230 with the redundant bar 210 being moved so as to ensure that the valve opens in compliance with the controlled relationship.

The following step 55 consists in servo-controlling the position of the main bar 110 to a predefined parameter (such as a parameter associated with the operation of a gas generator which is being fed via the valve).

In parallel, in a step 56, a detector for detecting the position of the main bar 110 delivers information to the regulation loop which performs a test in a step 57. If it is observed that variations in the position of the main bar 110 are not in compliance with the servo-control commands, then the servo-control passes via a step 58 to the redundant control device 230, with the position of the redundant bar 210 being controlled so as to ensure that the opening of the valve is servo-controlled to the variations of the predefined parameter.

Following step 59 consists in using the main control device 130 to control closing of the valve by displacing the main bar 110 in compliance with a controlled relationship.

In parallel, in a step 60, a detector for detecting the position of the main bar 110 provides information to the regulation loop which performs a test in step 61. If it is found that the valve is closing in compliance with the controlled relationship, then the method moves on to a step 63 which constitutes the end of the process or a step of waiting for the next command to open the valve in which case the various steps are repeated from step 51.

In contrast, if the valve does not close in compliance with the controlled relationship, the test 61 causes the method to pass to step 62 in which the redundant control device 230 is used to control closing of the valve by displacing the redundant bar 210 in compliance with the controlled relationship, prior to the final step 63.

FIGS. 11 to 16 relate to another embodiment of the invention in which the main shutter assembly 100' and the redundant shutter assembly 200', although still placed in axial alignment as in FIGS. 1 to 4 and 7 to 10, respectively comprise a main throttle element 110' and a redundant throttle element 210' which are not movable in translation but which are movable in rotation about their common axis so as to enable them to open or close the valve in redundant manner in application of a process similar to that described above with reference to the preceding embodiments.

In the embodiment of FIGS. 11 to 16, elements similar to those of the embodiment of FIGS. 1 to 4 and 10 are given the same references together with a prime symbol. As a result, each of the component elements of the redundant valve having rotary throttle elements is not described again in detail.

Figure 11:
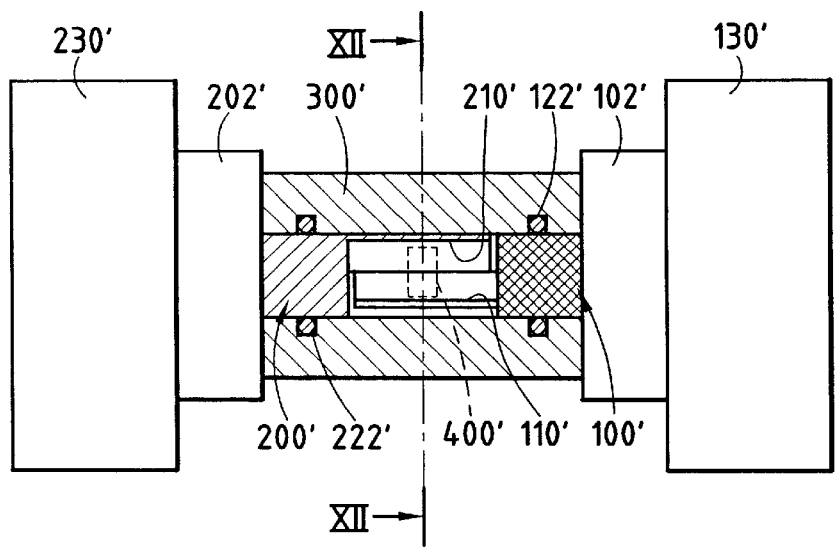
FIG. 11 is a diagrammatic section view on a plane perpendicular to the fluid flow showing an example of a redundant regulation valve of the invention, in which the flow throttling elements are movable in rotation.

In FIG. 11, there are shown in symbolic manner the main and redundant control devices 130' and 230', the device 102' having opening and closing abutments for the valve with respect to the main shutter assembly 100', the device 202' having at least one opening abutment of the valve for use by the redundant shutter assembly 200', gaskets 1221 and 222', and the main and redundant throttle elements 110' and 210' for closing the fluid flow channel 400' provided through the valve body 300'.

Figure 12:
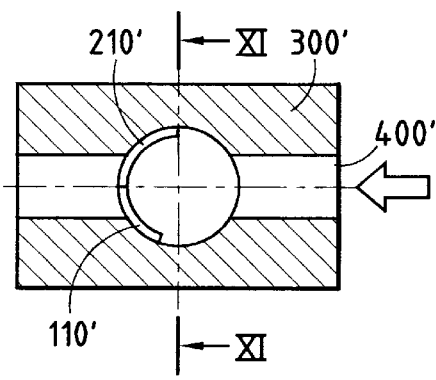
FIG. 12 is a section on plane XII—XII of FIG. 11 and is a view of the valve in its normal closed position.
Figure 14:
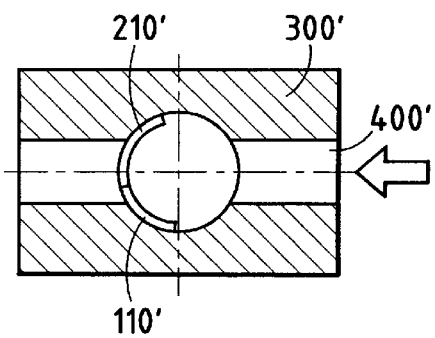
FIG. 14 is a section analogous to that of FIG. 12, corresponding to a breakdown of the main throttle element with closure by means of the redundant throttle element.

As can be seen in FIGS. 11 and 12, the main and redundant throttle elements 110' and 210' are constituted by curved plates constituting cylinder portions which are secured to the aligned rotary bars of the main and redundant shutter assemblies 100' and 200'.

In the normal closed position as shown in FIGS. 11 and 12, the channel 400' is completely obstructed by the main and redundant throttle elements 110' and 210' in their respective closed positions, with each of these elements 110' and 210' obstructing half of the hydraulic channel 400'.

Figure 13:
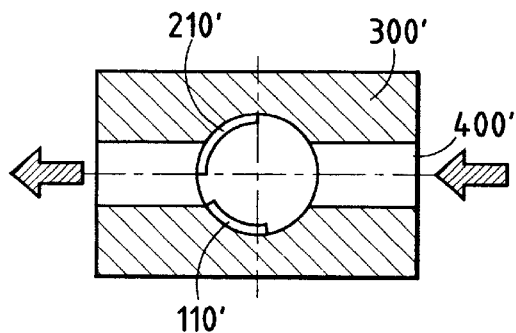
FIG. 13 is a section analogous to that of FIG. 12, showing the valve with its main throttle element in its fully-open position.
Figure 15:
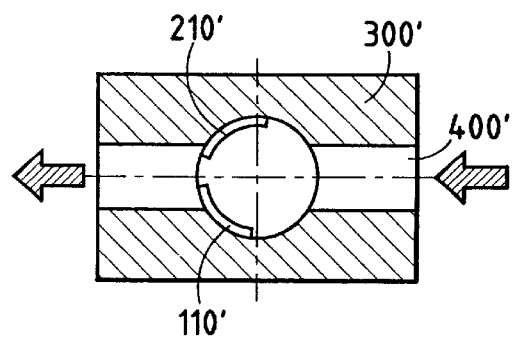
FIG. 15 is a section analogous to that of FIG. 12, but corresponding to a breakdown of the main throttle element with the valve being opened by the redundant throttle element.

The redundant throttle 210' extends over an angular sector that is larger than that of the main throttle element 110'. When the valve is opened normally, the main throttle element 110' is the only element to be retracted and it is retracted into the fully-open position as shown in FIG. 13, such that this main element 110' acts only over half of the passage of the channel 400'. In contrast, in the event of a breakdown affecting the main throttle element 110' or its control device 130', the redundant throttle element 210' must be capable of moving in rotation either in a retraction direction relative to the channel 400' (FIG. 15) so as to open the valve, or else in a direction for completely obstructing the channel 400' (FIG. 14) by moving up to the main throttle element after it has become blocked in its open position. The redundant element 210' must thus be capable of covering an angular sector corresponding to the full section of the passage of the channel 400'.

Figure 16:
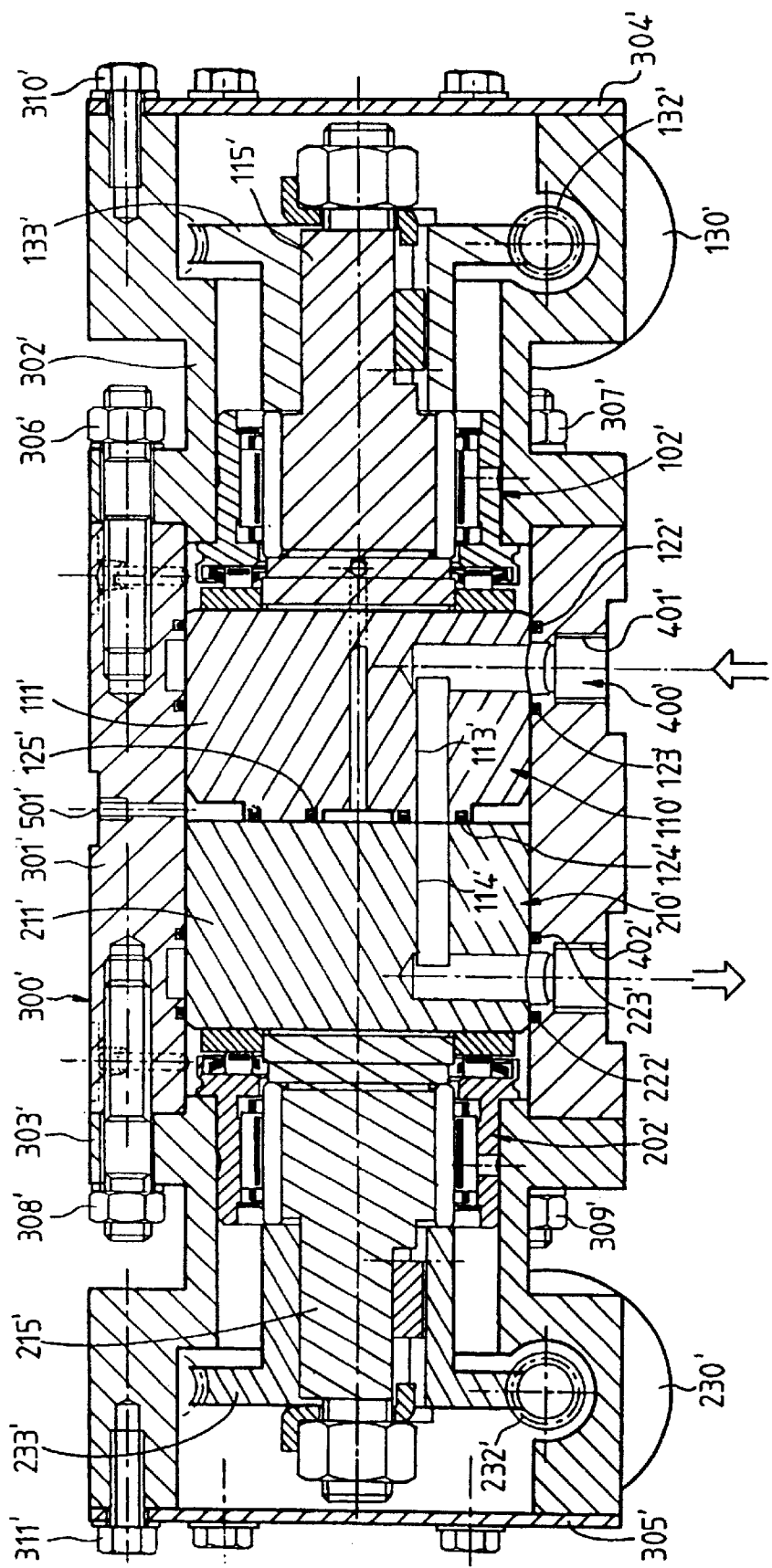
FIG. 16 is an axial section view of a redundant regulation valve constituting a particular embodiment of the invention having two rotary throttle bars that are in axial alignment.

FIG. 16 shows a particular embodiment of a fully-redundant valve having rotary shutter elements.

The valve body comprises elements 301' and 305' that are united by link means 306' to 311'. The fluid flow channel 400' has an inlet 401', an outlet 402', and ducts 113' and 114' formed in the main head portions 111' and 211' of the main and redundant throttle elements 110' and 210'. The ducts 113' and 114' are put into partial or full communication in selective manner only as a function of the relative rotary positions of the throttle elements 110' and 210', in a process analogous to that described above with reference to FIGS. 11 to 15. FIG. 16 shows the valve in an open position. In a normal closed position, the control devices 130' and 230' act on the rear portions 115' and 215' of the main and redundant rotary bars 100' and 200' in such a manner that each of the throttle elements 110' and 210' obstructs half of the flow section 400' in the vicinity of the ducts 113' and 114'.

Each of the main and redundant control devices 130' and 230' preferably comprises a respective electric motor capable of transmitting motion via a screw-and-nut assembly 132'–133' or 232'–233', or the like with the rotary elements being automatically held or braked in the positions given to them by the corresponding control devices.

References 122' to 125' and 223', 224' show various sealing gaskets associated with the main shutter assembly 100' and with the redundant shutter assembly 200'.

Reference 501' designates an annular position sensor for sensing the position of the main shutter assembly 100'. This sensor 501' can naturally be located in various different places.

References 102' and 202' designate abutment-forming and shock-absorbing assemblies that act during rotary displacements of the main and redundant shutter assemblies 100' and 200'.

What is claimed is:

1. A redundant regulation valve for controlling fluid flow, the valve comprising a valve body defining a fluid flow passage, said valve body comprising first guiding means for guiding a main throttle element that is movable by means of a main control device to selectively obstruct said passage, and second guiding means for guiding a redundant throttle element movable by means of a redundant control device, wherein said first and second guiding means are aligned together so that the main and redundant throttle elements are moved by said main and redundant control devices relative to each other in the valve body such that in the closed position of the valve, in normal operation, the main element and the redundant element are in contact with each other, wherein in said normal closed position, the main element is in the vicinity of its position of maximum displacement in the closure direction and obstructs only about half of the passage, while the redundant element is in a medium displacement position, and wherein the stroke of the redundant element is such that the redundant element can be controlled to obstruct the passage even when the main element is in its fully-open position.

2. A valve according to claim 1, wherein the main throttle element or the main control device is associated with an abutment device that acts in the fully-open position and in the normally closed position of the valve, and wherein the redundant throttle element or the redundant control device is associated with an abutment device that acts in the fully-open position of the main throttle element and in the emergency closure position of the redundant throttle element.

3. A valve according to claim 1, including sealing means disposed in the vicinity of the main throttle element and the redundant throttle element.

4. A valve according to claim 1, wherein the main control device comprises an electric motor and a screw-and-nut assembly driving the main throttle element.

5. A valve according to claim 1, wherein the redundant control device comprises an electric motor and a screw-and-nut assembly driving the redundant throttle element.

6. A valve according to claim 1, wherein the main control device is associated with a regulation loop, comprising:
   a) means for causing the main element to open in compliance with a controlled relationship until it reaches its nominal open position;
   b) means for acting when said nominal open position is reached, to servo-control the position of the main element to a predefined parameter associated with a member fed by the flow of fluid through the valve; and
   c) means for causing the main element to close in compliance with a second controlled relationship to ensuring end-of-stroke braking of the main element so that it comes into abutment against the redundant element to close the valve.

7. A valve according to claim 6, wherein the regulation loop associated with the main control device and with the redundant control device further comprises:
   d) means for detecting that opening of the main element is not in compliance with said first controlled relationship;
   e) means for controlling displacement of the redundant element in the event of non-compliance with said first controlled relationship during opening of the main element;
   f) means for detecting non-compliance of the servo-control of the main element with said predefined parameter;
   g) means for servo-controlling displacement of the redundant element in the event of non-compliance of said servo-control of the main element;
   h) means for detecting non-compliance of the closure of the main element with said second controlled relationship; and
   i) means for causing the displacement of the redundant element in the event of non-compliance with said second controlled relationship during closure of the main element.

8. A valve according to claim 1, wherein the main throttle element and the redundant throttle element are respectively constituted by a main throttle bar and by a redundant throttle bar in axial alignment and axially movable in translation respectively by means of the main control device and by means of the redundant control device.

9. A valve according to claim 8, wherein the axially-aligned main bar and redundant bar are in contact in the normal closed position via annular plane front surfaces.

10. A valve according to claim 8, wherein the axially-aligned main bar and redundant bar are in contact in the normal closed position via conical or bullet-shaped circularly symmetrical surfaces.

11. A valve according to claim 8, wherein the main bar and the redundant bar are coaxial and partially engaged one in the other.

12. A valve according to claim 11, wherein the main bar has internal channels allowing the flow to pass through and opening out radially via openings passing through the cylindrical wall of said main bar, wherein gaskets are interposed between the coaxial cylindrical surfaces of the main bar and of the redundant bar, and wherein at least one of the radial openings of the main bar is selectively obstructable by the cylindrical wall of the redundant bar in which the main bar is engaged.

13. A valve according to claim 1, wherein the main throttle element and the redundant throttle element are respectively constituted by a main throttle bar and by a redundant throttle bar which are in axial alignment and which are provided with throttle flaps movable in rotation respectively by means of the main control device and by means of the redundant control device.

14. A valve according to clam 1, including shock absorber devices disposed at the interfaces between the main control device and the main throttle element, and between the redundant control device and the redundant throttle element.

15. A valve according to claim 1, wherein the fluid flow passage is in series with a propellant feed pipe for controlling the feed of propellant to a gas generator driving turbopumps for feeding propellants to a rocket engine.

16. A valve according to claim 1, wherein the fluid flow passage is in series with a propellant feed pipe for controlling the feed of propellant to a gas generator driving turbopumps for feeding propellants to a rocket engine, and wherein said predefined parameter is constituted by the power of the gas generator.

17. A valve according to claim 13, including shock absorber devices disposed at the interfaces between the main control device and the main throttle element, and between the redundant control device and the redundant throttle element.

* * * * *

UNITED STATES PATENT AND TRADEMARK OFFICE
CERTIFICATE OF CORRECTION

PATENT NO.    : 6,223,774 B1                                              Page 1 of 1
DATED         : May 1, 2001
INVENTOR(S)   : Jean-Pierre Fournier et al It is certified that error appears in the above-identified patent and that said Letters Patent is hereby corrected as shown below:

<u>Column 9</u>,
Line 56, "1221" should read -- 122´ --.

Signed and Sealed this

Twenty-third Day of April, 2002

Attest:

JAMES E. ROGAN
*Attesting Officer*    *Director of the United States Patent and Trademark Office*